UNITED STATES PATENT OFFICE.

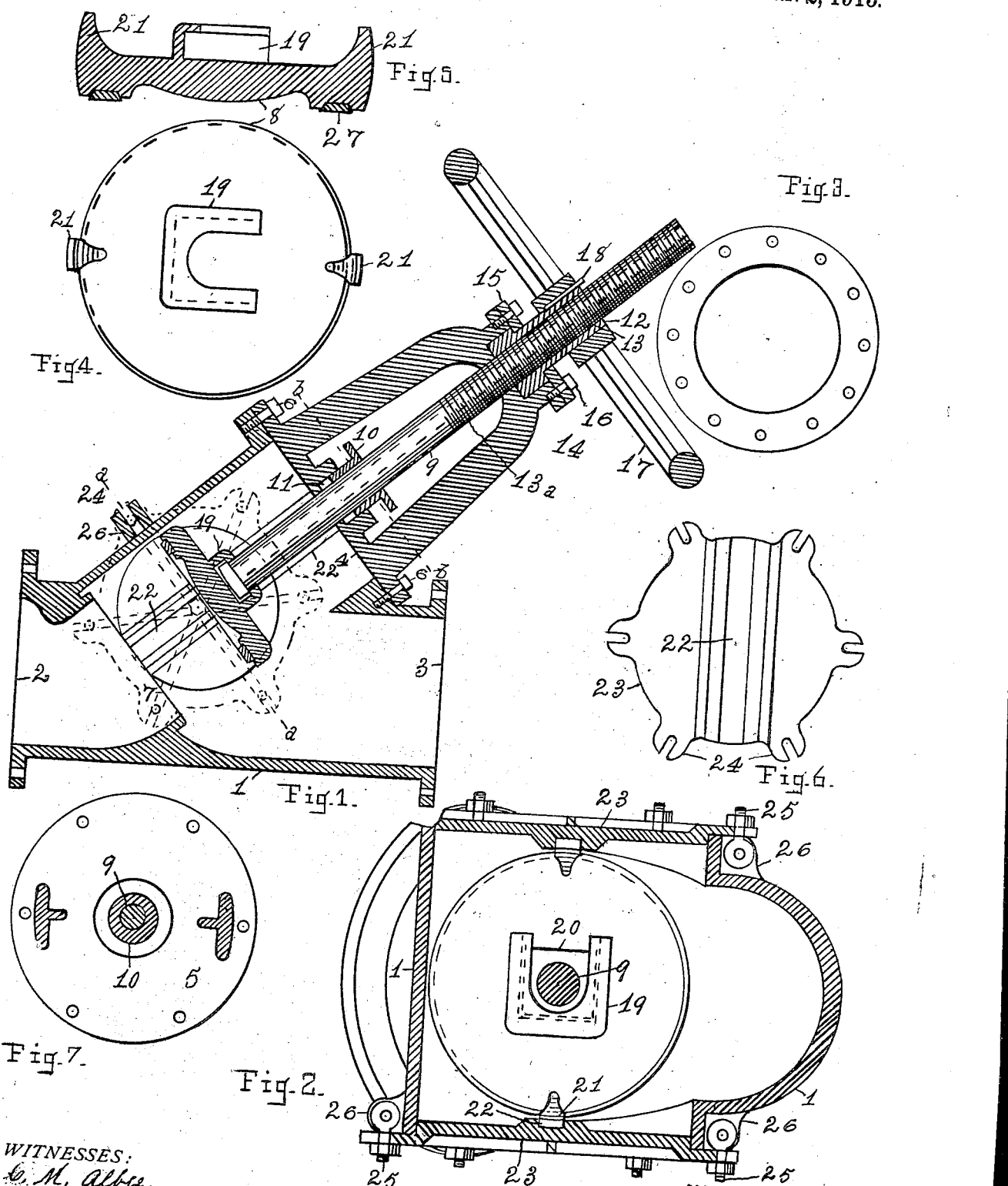
H. HORKMAN.
BLOW-OFF VALVE.
APPLICATION FILED AUG. 8, 1914.
1,130,286.
Patented Mar. 2, 1915.

HENRY HORKMAN, OF NEENAH, WISCONSIN.

BLOW-OFF VALVE.

1,130,286. Specification of Letters Patent. Patented Mar. 2, 1915.

Application filed August 8, 1914. Serial No. 855,719.

*To all whom it may concern:*

Be it known that I, HENRY HORKMAN, a citizen of the United States, residing at Neenah, in the county of Winnebago and State of Wisconsin, have invented a new and useful Blow-Off Valve, of which the following is a specification.

My invention relates to a blow-off valve for paper pulp digesters, and consists of a novel manner of forming hand hole covers for the valve body or shell, as will be shown in the accompanying drawing, in which,—

Figure 1 is a sectional side elevation of the valve. Fig. 2 is a plan in section, upon the line $a, a,$ of Fig. 1, and through the hand hole covers, with the valve below said line. Fig. 3 is a plan of the right hand end, or discharging end of the valve shell in Fig. 1, the left hand end being similar, but slightly larger. Fig. 4 is a plan of the valve. Fig. 5 is a section diametrically through the valve. Fig. 6 is a plan of the inner side of one of the hand hole covers. Fig. 7 is a section across the screw and packing gland holder upon the line $b, b,$ of Fig. 1, the holder being bolted to the valve shell or casing. Figs. 1, 3, 6 and 7 are upon the same scale, the others upon a larger one.

Similar numerals indicate like parts in the several views.

The novelty in the formation of the valve consists in locating hand holes upon opposite sides of the valve shell, and where the valve can be easily reached for cleaning it of any accumulations of pulp, and in forming grooves upon the inner sides of the covers, said grooves registering with other grooves in the valve shell.

1, indicates the body or shell of the valve, which is angular relative to its openings, it having three, an entrance for pulp from the digester at 2, and a discharge outlet 3, the third branch 4 being arranged for having a nut and gland holder 5, bolted to it with bolts 6. The shell 1 is provided with a valve seat 7 and a valve 8, the valve being provided with a stem 9, which is arranged to slide through the holder 5, and is provided with a packing gland 10 and packing 11. The nut 12 is provided with threads 13, which engage like threads 13ª, upon the stem 9, the nut being retained within the holder by means of an enlargement 14, which is fitted to a counterbore in the holder 5, and is held in said counterbore by means of a ring plate 15, which is bolted to the holder 5 with bolts 16. The nut is surmounted with a hand wheel 17, and is secured thereto with the key 18. The valve is provided with a socket 19, for receiving and holding the enlargement 20, upon the lower end of the stem 9, and with ears 21, which are fitted to slide in grooves 22, in opposite hand hole covers 23, the grooves being continued along the inside of the shell to the opening 4, for guiding the valve for its full opening. The hand hole covers, shown in Fig. 2, are provided with ears 24, for receiving the hinged fastening bolts 25. The bolts 25 are each hinged between ears 26, upon the shell, one pair being shown at the side of the shell in Fig. 1. By loosening the nuts upon the bolts 25 around a cover, but not removing them, the bolts can be swung outward and the cover removed, and thereby giving access to the interior of the valve shell for removing any accumulations of matter after blowing off. The lower side of the valve is provided with an annular groove for receiving suitable material 27, for being seated upon the valve seat 7 when the valve is screwed down thereon.

Having described my invention, what I claim and desire to secure by Letters Patent, is,—

In a blow-off valve for pulp digesters and similar uses, a suitable shell for containing a valve having receiving and discharge openings, a valve seat around the receiving opening, a valve adapted to be seated thereon, ears upon opposite edges of the valve, mechanism for opening and closing the valve, a hand hole through the shell at opposite sides thereof and giving access to the valve, a cover for each hand hole, means for securing the covers over the hand holes, a groove upon the inner face of each cover fitted for receiving an ear of said valve and to guide the valve when opening and closing, and a continuation of said grooves upon the inside of the shell for guiding the valve for its full opening.

HENRY HORKMAN.

Witnesses:
HENRY A. FUSS,
C. M. ALBEE.